US008954641B2

(12) United States Patent
Lim et al.

(10) Patent No.: US 8,954,641 B2
(45) Date of Patent: Feb. 10, 2015

(54) METHOD AND APPARATUS FOR ESTABLISHING COMMUNICATION

(75) Inventors: Byung-Soo Lim, Seongnam-si (KR); In-Young Shin, Suwon-si (KR); Joon-oo Kim, Suwon-si (KR); Tae-Hwan Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 284 days.

(21) Appl. No.: 13/211,844

(22) Filed: Aug. 17, 2011

(65) Prior Publication Data

US 2012/0054385 A1    Mar. 1, 2012

(30) Foreign Application Priority Data

Aug. 26, 2010  (KR) .................. 10-2010-0083064

(51) Int. Cl.
G06F 13/42 (2006.01)
H04L 12/28 (2006.01)
G06F 13/00 (2006.01)

(52) U.S. Cl.
CPC ........ *H04L 12/2809* (2013.01); *H04L 12/2827* (2013.01); *H04L 12/2829* (2013.01)
USPC ............................. 710/105; 709/220; 709/230

(58) Field of Classification Search
CPC ....... G06F 13/42; G06F 13/00; G06F 15/177; G06F 15/173; G06F 3/00
USPC .................. 709/220–222, 230; 710/104–105, 710/62–63
See application file for complete search history.

(56) References Cited

U.S. PATENT DOCUMENTS

| 7,586,905 | B2* | 9/2009 | Okmianski et al. | 370/352 |
|---|---|---|---|---|
| 7,698,467 | B2* | 4/2010 | Kim et al. | 709/246 |
| 7,865,436 | B2* | 1/2011 | Celi et al. | 705/39 |
| 7,962,097 | B2* | 6/2011 | Jung et al. | 455/41.2 |
| 8,364,176 | B2* | 1/2013 | Lee et al. | 455/458 |
| 2003/0045355 | A1* | 3/2003 | Comair | 463/40 |
| 2005/0053017 | A1* | 3/2005 | Komiya et al. | 370/255 |
| 2006/0094360 | A1* | 5/2006 | Jung et al. | 455/41.2 |
| 2006/0235987 | A1* | 10/2006 | Goto et al. | 709/230 |
| 2006/0259575 | A1* | 11/2006 | Upendran et al. | 709/217 |
| 2007/0005507 | A1* | 1/2007 | Chatte et al. | 705/62 |
| 2007/0088814 | A1* | 4/2007 | Torii | 709/223 |
| 2008/0046978 | A1* | 2/2008 | Rieger | 726/4 |
| 2009/0106150 | A1* | 4/2009 | Pelegero et al. | 705/44 |
| 2009/0106394 | A1* | 4/2009 | Lin et al. | 709/218 |

(Continued)

FOREIGN PATENT DOCUMENTS

| KR | 10-2005-0105557 | 11/2005 |
|---|---|---|
| KR | 10-2008-0098273 | 11/2008 |

(Continued)

OTHER PUBLICATIONS

International Search Report dated Mar. 19, 2012 in connection with International Patent Application No. PCT/KR2011/006308.

(Continued)

*Primary Examiner* — Christopher Shin

(57) ABSTRACT

A method and apparatus for establishing communication between a first device and a second device. In the method, the second device recognizes a mark representing the first device to establish communication with the first device, and establishes communication with the first device, based on information included in the mark.

28 Claims, 13 Drawing Sheets

(56) References Cited

U.S. PATENT DOCUMENTS

| | | | |
|---|---|---|---|
| 2009/0177971 A1* | 7/2009 | Kim et al. | 715/739 |
| 2010/0082784 A1* | 4/2010 | Rosenblatt et al. | 709/222 |
| 2010/0185729 A1* | 7/2010 | Lord et al. | 709/203 |
| 2010/0211979 A1* | 8/2010 | Konno et al. | 725/59 |
| 2010/0281428 A1* | 11/2010 | Kuroda | 715/811 |
| 2011/0071895 A1* | 3/2011 | Masri | 705/14.27 |

FOREIGN PATENT DOCUMENTS

| | | |
|---|---|---|
| KR | 10-2009-0061155 | 6/2009 |
| WO | WO 2006/083416 A2 | 8/2006 |
| WO | WO 2007/057758 | 5/2007 |

OTHER PUBLICATIONS

Written Opinion of international Searching Authority dated Mar. 19, 2012 in connection with International Patent Application No. PCT/KR2011/006308.

Extended EuropeanSearch Report and European Search Opinion dated Nov. 22, 2011 in connection with European Patent Application No. 11178915.2.

Andreas Fasbender et al.: "Phone-Controlled Delivery of NGN Services into Residential Environments", Next Generation Mobile Appliations, Services and Technologies, 2008, NGMAST '08, The Second International Conference on Next Generation Mobile Applications, IEEE, Piscataway, NJ, Sep. 16, 2008, pp. 196-203.

European Examination Report dated May 3, 2013 in connection with European Patent Application No. 11178915.2, 6 pages.

\* cited by examiner

FIG. 4
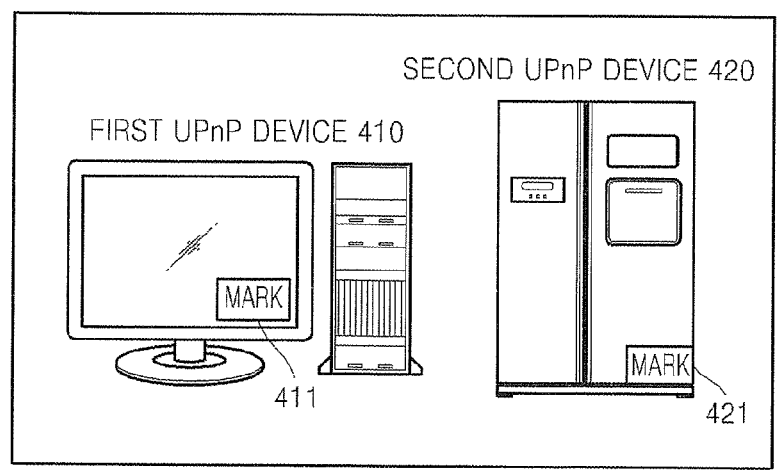
(a)
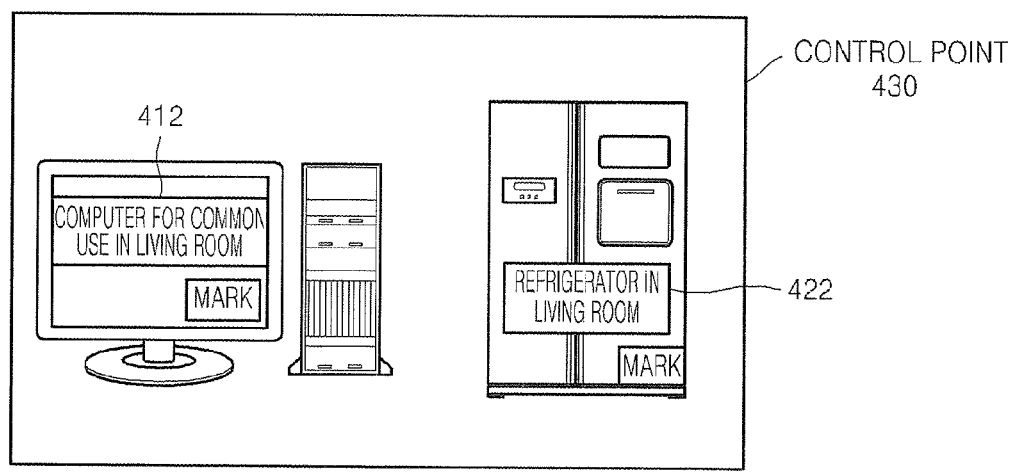
(b)

FIG. 8

```
NOTIFY * HTTP/1.1
HOST: 239.255.255.250:1900
Cache-Control:max-age=120
Location:192.168.1.1:5678/rootDesc.xml
NT:uuid:  upnp-InternetGatewayDevice-1_0-0090a2777777
USN: uuid:7076436f-6e65-1063-8074-001377666bb6 ─── 810
NTS:ssdp:alive
Server:NT/5.0 UPnP/1.0
<: blank line :>
```

FIG. 9

```xml
<?xml version="1.0"?>
<root xmlns="urn:schemas-upnp-org:device-1-0">
<specVersion>
<major>1</major>
<minor>0</minor>
</specVersion>

<URLBase>base URL for all relative URLs</URLBase>

<device>
<deviceType>urn:schemas-upnp-org:device:deviceType:v</deviceType>
<friendlyName>short user-friendly title</friendlyName>
<manufacturer>manufacturer name</manufacturer>
<manufacturerURL>URL to manufacturer site</manufacturerURL>
<modelDescription>long user-friendly title</modelDescription>
<modelName>model name</modelName>
<modelNumber>model number</modelNumber>
<modelURL>URL to model site</modelURL>
<serialNumber>manufacturer's serial number</serialNumber>
<UDN>uuid:UUID</UDN>
<UPC>Universal Product Code</UPC>
<deviceMarkerURL>URL for Device Marker</deviceMarkerURL>         — 910
<iconList>
<icon>
<mimetype>image/format</mimetype>
<width>horizontal pixels</width>
<height>vertical pixels</height>
<depth>color depth</depth>
<url>URL to icon</url>
</icon>
XML to declare other icons, if any, go here
</iconList>

<serviceList>
<service>
<serviceType>urn:schemas-upnp-org:service:serviceType:v</serviceType>
<serviceId>urn:upnp-org:serviceId:serviceID</serviceId>
<SCPDURL>URL to service description</SCPDURL>
<controlURL>URL for control</controlURL>
<eventSubURL>URL for eventing</eventSubURL>
</service>

Declarations for other services defined by a UPnP Forum working
committee (if any) go here
Declarations for other services added by UPnP vendor (if any) go here </serviceList>

<deviceList>
Description of embedded devices defined by a UPnP Forum working
committee (if any) go here
Description of embedded devices added by UPnP vendor (if any) go here
</deviceList>

<presentationURL>URL for presentation</presentationURL>

</device>

</root>
```

METHOD AND APPARATUS FOR ESTABLISHING COMMUNICATION

CROSS-REFERENCE TO RELATED APPLICATION(S) AND CLAIM OF PRIORITY

The present application is related to and claims the benefit of Korean Patent Application No. 10-2010-0083064, filed on Aug. 26, 2010, in the Korean Intellectual Property Office, the disclosure of which is incorporated herein in its entirety by reference.

TECHNICAL FIELD OF THE INVENTION

One or more aspects of the present invention relate to methods and apparatuses for establishing communication, and more particularly, to a method and apparatus for establishing communication between a Universal Plug and Play (UPnP) device and a control point.

BACKGROUND OF THE INVENTION

Today, with advances in information and communications technologies, home networks have come into widespread use. In general, Universal Plug and Play (UPnP) devices are used in a home network, since it is easy to join UPnP devices to a home network and to provide and use content by using UPnP devices.

In UPnP technologies, UPnP devices are controlled using a control point. The control point may be one of the UPnP devices. The control point stores information regarding the UPnP devices, but if the same or similar types of UPnP devices are registered with the control point, it would be difficult for a user to distinguish the devices from one another, based on only the stored information.

SUMMARY OF THE INVENTION

To address the above-discussed deficiencies of the prior art, it is a primary object to provide a method and apparatus for efficiently establishing communication between a Universal Plug and Play (UPnP) device and a control point.

According to an aspect of the present invention, there is provided a method of establishing communication, the method including recognizing, by a second device, a mark representing a first device so as to establish communication with the first device. The method also includes establishing, by the second device, communication with the first device, based on information included in the mark.

The establishing of the communication with the first device may include requesting the first device to provide detailed information including information regarding services provided by the first device, based on the information included in the mark, and obtaining the detailed information from the first device.

The recognizing of the mark may include obtaining image data of the first device by using an imaging unit of the second device, and analyzing the image data to recognize the mark. The method may further include outputting the image data of the first device together with information regarding the first device.

The establishing of the communication with the first device may further include receiving at least one service from the first device, based on a user's input corresponding to the output image data and the information.

The establishing of the communication with the first device may further include providing the first device with at least one service received from a third device, based on a user's input corresponding to the output image data and the information.

The method may further include receiving, by the second device, brief information regarding the first device from the first device, the brief information including identification information regarding the first device. The establishing of the communication with the first device may include searching, by the second device, for the brief information regarding the first device by comparing the information included in the mark with brief information regarding at least one device included in a network to which the second device belongs. The establishing may also include establishing communication, by the second device, with the first device, based on the searched-for brief information.

The mark may be a quick response (QR) code output to a display unit included in the first device.

The information included in the mark may include identification information regarding the first device and additional information regarding the first device.

The additional information may include at least one of a flag indicating whether a state of the first device changes, and information regarding a change in the state of the first device.

The detailed information may include at least one of a list of services that the first device provides, state information regarding the first device, and manufacturing information regarding the first device.

The first device may be a universal plug and play (UPnP) device, and the second device may be a control point that controls the UPNP device.

According to another aspect of the present invention, there is provided a method of establishing communication, the method including generating, by a first device, a mark representing the first device to be recognized by a second device. The method also includes displaying, by the first device, the mark. The method further includes establishing communication, by the first device, with the second device when the second device recognizes the mark.

The mark may include identification information regarding the first device and additional information regarding the first device.

The mark may include at least one of a flag indicating whether a state of the first device changes, and information regarding a change in the state of the first device.

The displaying of the mark may include outputting the mark to a display unit included in the first device.

The establishing of the communication with the second device may include receiving, by the first device, a request for detailed information regarding the first device from the second device, the detailed information including information regarding services provided by the first device. The establishing may also include transmitting, by the first device, the detailed information to the second device in response to the request.

According to another aspect of the present invention, there is provided an apparatus for establishing communication with an external device, the apparatus including a mark recognition unit configured to recognize a mark indicating the external device so as to establish communication with the external device. The apparatus also includes a communication establishing unit configured to establish communication with the external device, based on information included in the mark.

According to another aspect of the present invention, there is provided an apparatus for establishing communication with an external device, the apparatus including a mark generation unit configured to generate a mark indicating the apparatus to be recognized by the external device. The apparatus also includes a mark display unit configured to display the mark.

The apparatus further includes a communication establishing unit configured to establish communication with the external device when the external device recognizes the mark.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a diagram illustrating an operation of a communications system, according to an embodiment of the present invention;

FIG. 8 illustrates brief information regarding a first device, according to an embodiment of the present invention;

FIG. 9 illustrates detailed information regarding a first device, according to an embodiment of the present invention;

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Figure 1:
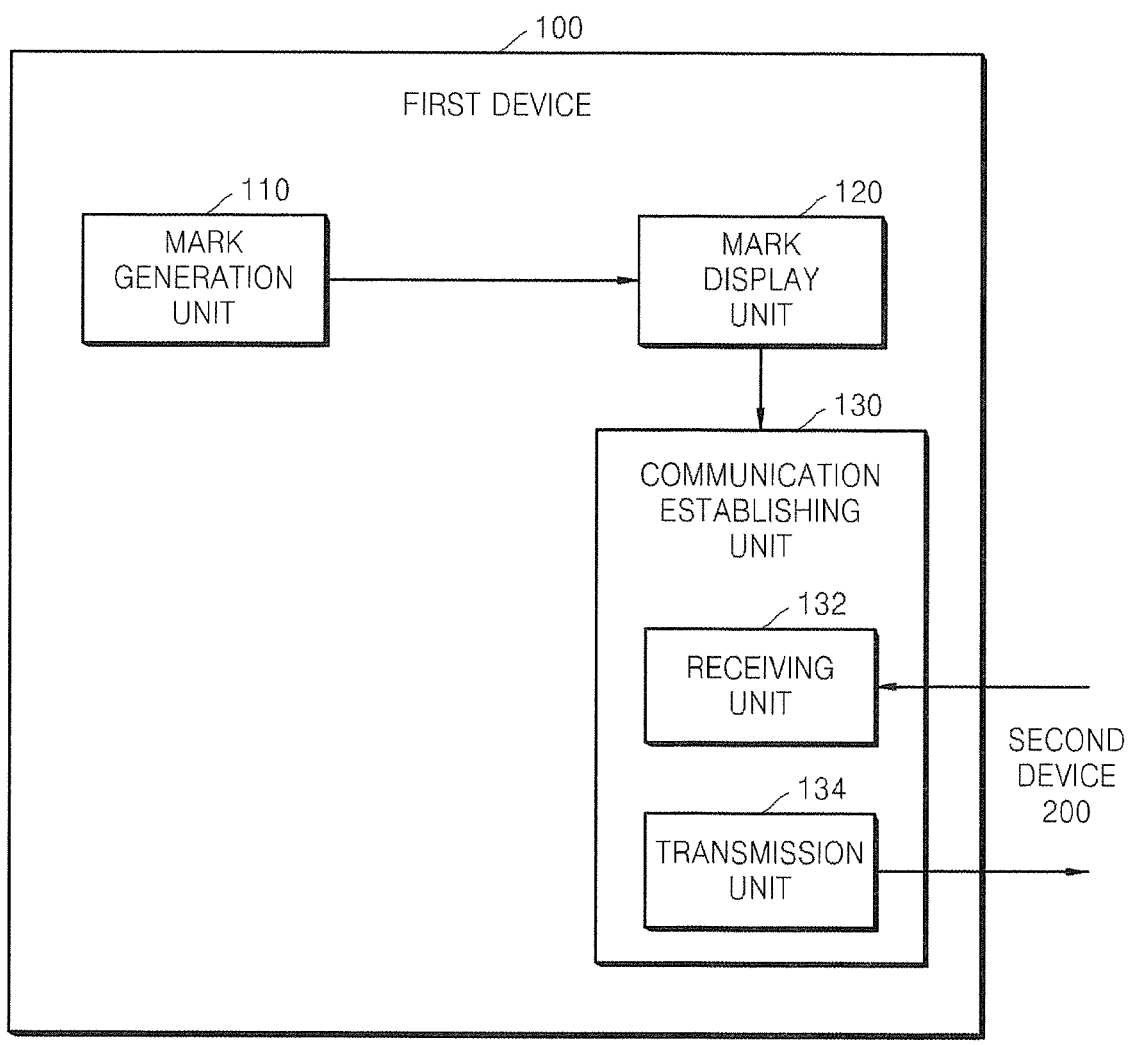
FIG. 1 is a block diagram of a first device according to an embodiment of the present invention.

FIG. 1 is a block diagram of a first device 100 according to an embodiment of the present invention. It is assumed in FIG. 1 that the first device 100 is a Universal Plug and Play (UPnP) device and a second device 200 is a control point, but the present invention is not limited to the field of UPnP technology. The first device 100 may be either a UPnP server that provides a service to another UPnP device or a UPnP client that receives a service from another UPnP device. In another embodiment of the present invention, the first device 100 may act as both a UPnP server and a UPnP client.

The first device 100 includes a mark generation unit 110, a mark display unit 120, and a communication establishing unit 130.

The mark generation unit 110 generates a mark identifying the first device 100. The mark may include identification information and additional information regarding the first device 100. The additional information may include various information regarding the first device 100. For example, the additional information may include type information regarding the first device 100 (indicating whether the first device 100 is, for example, a UPnP device, a digital living network alliance (DLNA) server, or a DLNA renderer), and a flag indicating whether a state of the first device 100 changes, e.g., a SystemUpdateID. If the state of the first device 100 changes, the change in the state of the first device 100 may be specified in the additional information.

The mark display unit 120 displays the generated mark. The mark display unit 120 may output the mark to a display unit (not shown) or may display the mark on a surface of the first device 100. If the first device 100 does not include a display unit, the mark display unit 120 may transmit the mark to the second device 200 via a network.

If the second device 200 recognizes the mark, the communication establishing unit 130 establishes communication with the second device 200. The communication establishing unit 130 may include a receiving unit 132 and a transmission unit 134.

The second device 200 requests the first device 100 to provide brief or detailed information regarding the first device 100 so as to establish communication with the first device 100. The receiving unit 132 receives a signal requesting the brief or detailed information regarding the first device 100 from the second device 200.

The brief information may include identification information regarding the first device 100, e.g., Unique User IDentifiers (UUIDs), location information regarding the first device 100, e.g., an Internet protocol (IP) address, and type information regarding the first device 100. The receiving unit 132 may receive the signal requesting the brief information regarding the first device 100 from the second device 200 when the first device 100 joins a network, when the first device 100 is powered on, or at predetermined time intervals.

The detailed information includes information regarding services provided by the first device 100. Specifically, the detailed information may include a list of the services provided by the first device 100, and service state information, e.g., service type information and digital rights management (DRM) information.

The detailed information may include state information regarding the first device 100. If an operating state of the first device 100 changes, for example, when the first device 100 is played, paused, powered off, or in a sleep mode, or if types of the services provided by the first device 100 change, then the state information may specify such a change.

The transmission unit 134 transmits the brief information or detailed information to the second device 200, in response to the signal requesting the brief or detailed information, received by the receiving unit 132.

A user may select that the first device 100 be a server device that provides a service or a client device that consumes a service, using the second device 200, which will be described in detail later.

If the first device 100 is selected to be a server device, the transmission unit 134 transmits data associated with providing a service selected by the user, to the second device 200. If a third device (not shown) is selected by the user to be a client device, the transmission unit 134 may transmit this data to the third device.

If the first device 100 is selected to be a client device, the receiving unit 132 may receive data associated with providing a service selected by the user from the second device 200. If a third device (not shown) is selected to be a server device, the receiving unit 132 may receive this data from the third device.

Figure 2:
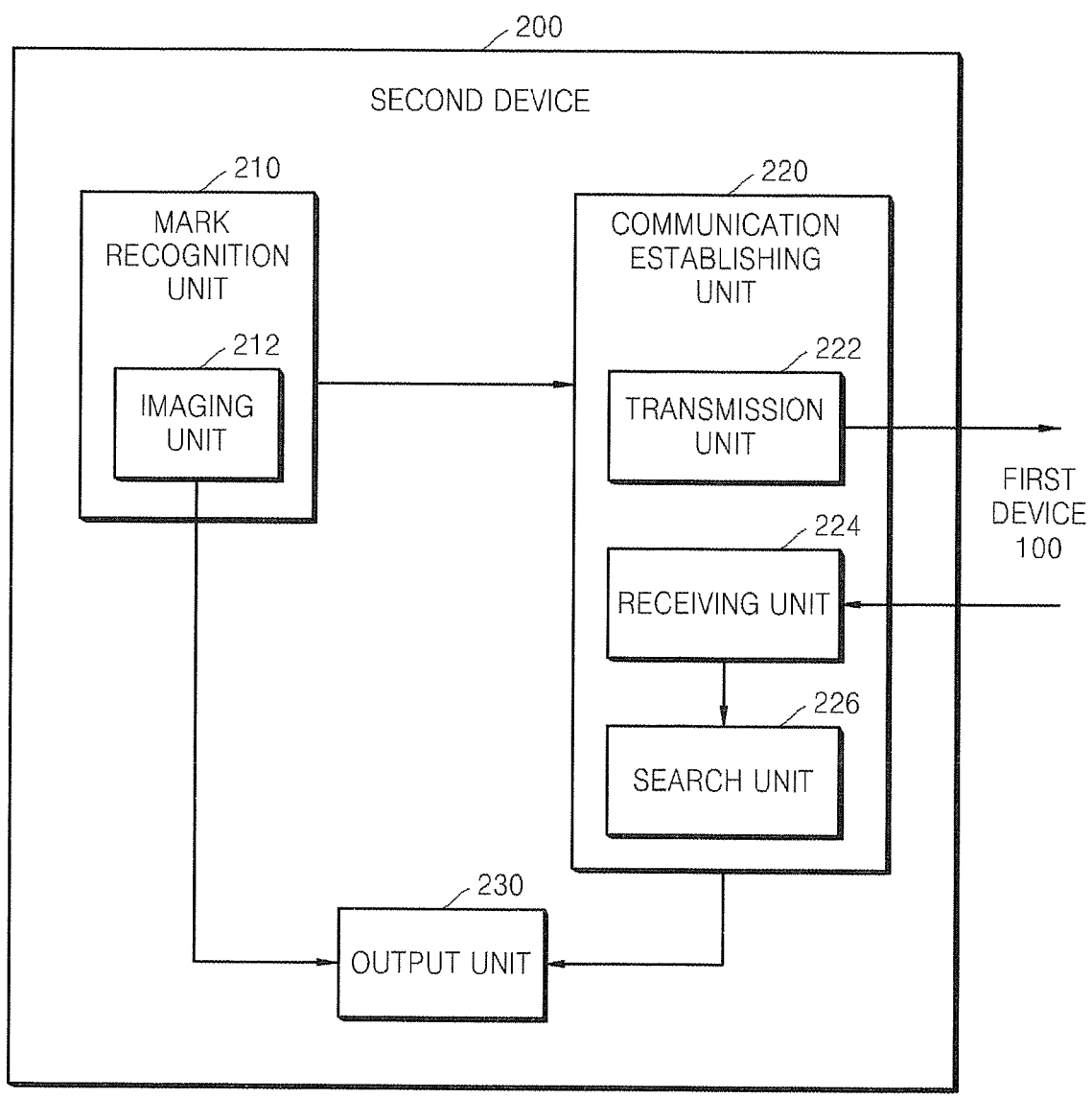
FIG. 2 is a block diagram of a second device according to an embodiment of the present invention.

FIG. 2 is a block diagram of a second device 200 according to an embodiment of the present invention. It is assumed in FIG. 2 that the second device 200 is a control point that controls UPnP devices and a first device 100 is a UPnP device, but the present invention is not limited to the field of UPnP technology.

The second device 200 includes a mark recognition unit 210 and a communication establishing unit 220.

The mark recognition unit 210 recognizes a mark of the first device 100. The mark may be output to a display unit (not shown) of the first device 100, displayed on a surface of the first device 100, or received via a network.

The mark recognition unit 210 may include an imaging unit 212. The imaging unit 212 captures image data regarding an external device, e.g., the first device 100, extracts a part related to the mark from the image data, and obtains information included in the mark.

The mark may include identification information and additional information regarding the first device 100. The additional information may include various information regarding the first device 100.

The communication establishing unit 220 establishes communication with an external device, e.g., the first device 100, based on the information included in the mark. The communication establishing unit 220 may include a transmission unit 222, a receiving unit 224, and a search unit 226.

The transmission unit 222 transmits a signal requesting brief information regarding the first device 100 when the first device 100 joins a network, when the first device 100 is powered on, or at predetermined time intervals. The brief information may include identification information, e.g., UUIDs, location information, e.g., an IP address, and type information regarding an external device, e.g., the first device 100.

The receiving unit 224 may receive the brief information regarding the first device 100 and store the brief information in a database (not shown) thereof. The database stores brief information regarding at least one external device, e.g., the first device 100.

The search unit 226 searches for the brief information regarding the first device 100 based on the identification information included in the mark. Although the second device 200 stores the brief information regarding at least one external device included in a network to which the second device 200 belongs, the second device 200 cannot identify the first device 100 before the mark is recognized.

The transmission unit 222 transmits a signal requesting detailed information regarding the first device 100 to the first device 100, based on the brief information regarding the first device 100. The transmission unit 222 may transmit the signal requesting the detailed information regarding the first device 100 to the first device 100, based on address information included in the brief information. The transmission unit 222 may transmit the signal requesting the detailed information only when the first device 100 is a server device acting as a server and may not transmit this signal when the first device 100 is a client device acting as a client. Whether the first device 100 is a server device may be determined based on the type information included in the brief information regarding the first device 100 or based on a user's input.

The receiving unit 224 receives the detailed information from an external device, e.g., the first device 100 in response to the signal requesting the detailed information.

The second device 200 may further include an output unit 230.

The output unit 230 outputs the image data of the first device 100 captured by the imaging unit 212 and information regarding the first device 100 obtained by the receiving unit 224 together. The information output together with the image data may be extracted from the brief information or the detailed information regarding the first device 100. The information output together with the image data may include information regarding, for example, a name and location of the first device 100.

A user may easily identify the first device 100 by checking both the image data of, and the information regarding, the first device 100.

The user selects that the first device 100 be a server device or a client device based on the image data of, and the information regarding, the first device 100.

If the first device 100 is selected to be a server device, the output unit 230 outputs a list of services that the first device 100 provides, based on the detailed information regarding the first device 100. If the user selects a service from among the list of services, then the transmission unit 222 transmits a signal requesting the selected service to the first device 100 and the receiving unit 224 receives data associated with providing the selected service, transmitted from the first device 100 in response to the request.

If the first device 100 is selected to be a client device, the transmission unit 222 transmits data associated with providing a service selected by the user to the first device 100.

As described above, the second device 200 may identify the first device 100 based on the mark regarding the first device 100 and may output the image data of, and the information regarding, the first device 100, thereby providing visual information to the user. Thus, the user may match a physical UPnP device with stored information thereof in an easy manner.

Also, the second device 200 may optionally request the detailed information regarding the first device 100, based on the mark regarding the first device 100. Accordingly, the second device 200 may easily perform device discovery.

Figure 3:
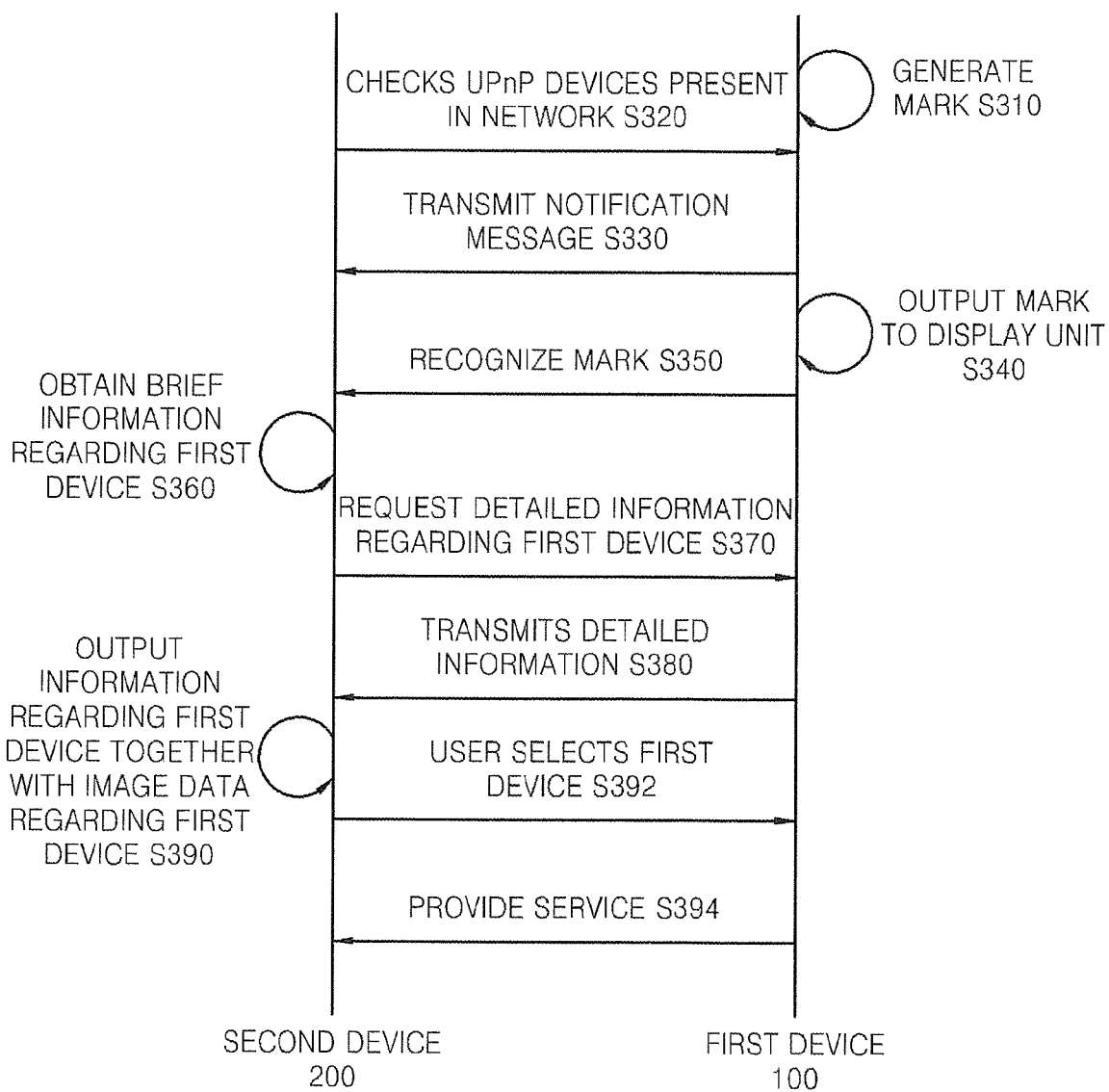
FIG. 3 is a flowchart illustrating a method of establishing communication between a first device and a second device, according to an embodiment of the present invention.

FIG. 3 is a flowchart illustrating a method of establishing communication between a first device 100 and a second device 200, according to an embodiment of the present invention.

In operation S310, the first device 100 generates a mark that allows the second device 200 to identify the first device 100.

In operation S320, the second device 200 checks UPnP devices present in a network. The checking may be a process, as a UPnP search process, performed by broadcasting an 'M-Search' command to devices present in the network by using a simple service discovery protocol (SSDP).

In operation S330, the first device 100 transmits a notification message based on the SSDP to the second device 200. The notification message includes brief information regarding the first device 100. According to an embodiment of the present invention, the notification message may further include an identifier and type information regarding the first device 100. It is assumed in FIG. 3 that the first device 100 transmits the notification message to the second device 200 upon a request from the second device 200. However, the present invention is not limited thereto and the first device 100 may transmit the notification message to the second device 200 when the first device 100 starts to operate or is added to the network.

The identifier of the first device 100 included in the notification message may be a UUID that is unique information regarding the first device 100. The UUID may be produced from either a clock signal from a central processing unit (CPU) (not shown) or a media access control (MAC) address.

In operation S340, the first device 100 outputs the mark generated in operation S310 to a display unit (not shown) thereof. The mark includes the identifier, e.g., the UUID, of the first device 100. The mark may be any type of code, e.g., a quick response (QR) code, containing the identifier of the first device 100. The mark may include not only the identifier of the first device 100 but also state information, e.g., a flag, of the first device 100 that indicates whether a state of the first device 100 changes.

In operation S350, the second device 200 recognizes the mark by using, for example, a camera.

In operation S360, the second device 200 obtains the identifier of the first device 100 from the mark, and obtains the brief information regarding the first device 100 by using the identifier.

In operation S370, the second device 200 requests the first device 100 to provide detailed information regarding the first device 100, based on the brief information.

In operation S380, the first device 100 transmits the detailed information to the second device 200. The detailed information may include, for example, a list of services that the first device 100 provides; unique manufacture information regarding the first device 100, e.g., a model name, a serial number, a manufacturer, or a universal serial locator (URL) of the manufacturer; a list of devices therein; URL information for device control or presentation; and a change in the state information regarding the first device 100.

In operation S390, the second device 200 outputs information regarding the first device 100 together with image data regarding the first device 100. The information regarding the first device 100 may be obtained from the brief information or the detailed information regarding the first device 100 as described above.

In operation S392, it is assumed that a user selects the first device 100.

In operation S394, when the first device 100 acts as a server, the second device 200 requests the first device 100 to provide a service. When the first device 100 acts as a client, the second device 200 provides a service to the first device 100. If the first device 100 may act both as a server and a client, an operation of the first device 100 may be determined by the user.

In another embodiment of the present invention, the user may select both a UPnP device to act as the server and a UPnP device to act as the client. In this embodiment, the first device 100 may directly transmit data to another UPnP device without having to use the second device 200.

FIG. 4 is a diagram illustrating an operation of a communications system, according to an embodiment of the present invention. Specifically, FIG. 4(*a*) illustrates a real environment in which a first UPnP device 410 and a second UPnP device 420 are preset. The first UPnP device 410 is a desk-top computer and may act as both a server and a client. The second UPnP device 420 is a refrigerator and may act as only a server.

FIG. 4(*b*) illustrates image data of the real environment captured by a user by using an imaging unit (not shown) included in a control point 430. The control point 430 analyzes the image data to recognize a first mark 411 received from the first UPnP device 410 and a second mark 421 received from the second UPnP device 420. The control point 430 searches for brief information regarding the first UPnP device 410 and the second UPnP device 420, based on the first and second marks 411 and 421, and then outputs the searched-for brief information together with the image data.

Referring to FIG. 4(*b*), the control point 430 combines a name 'computer for common use in a living room' 412 of the first UPnP device 410 with image data of the first UPnP device 410, combines a name 'refrigerator in the living room' 422 of the second UPnP device 420 with image data of the second UPnP device 420, and then outputs results of the combining. Thus, the user may easily identify the first and second UPnP devices 410 and 420 by checking information regarding the first and second UPnP devices 410 and 420 and the results of the combining.

Figure 5:
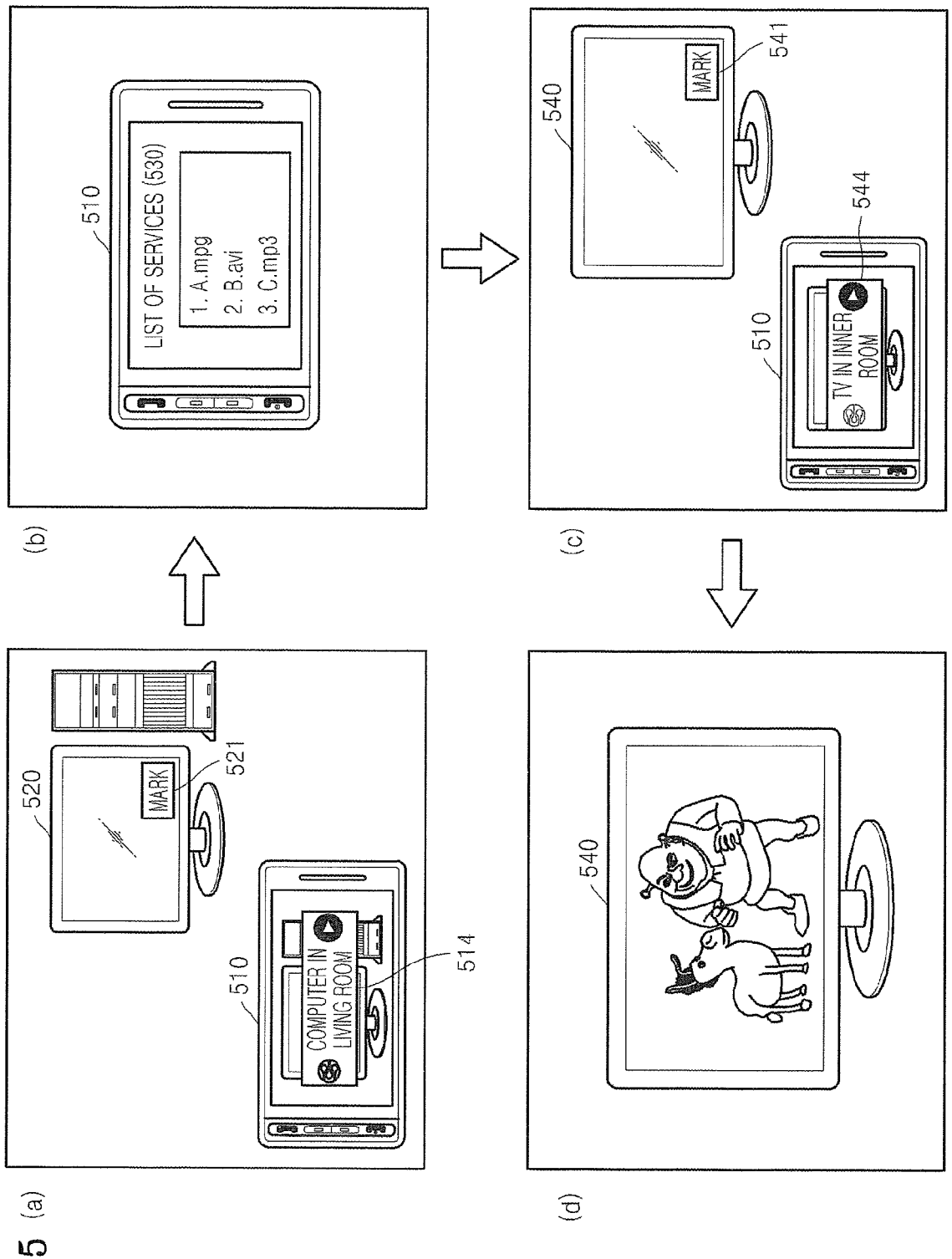
FIG. 5 is a diagram illustrating a method of providing content to a user by using a communication establishing system, according to an embodiment of the present invention.

FIG. 5 is a diagram illustrating a method of providing content to a user by using a communication establishing system, according to an embodiment of the present invention. Referring to FIG. 5, a mobile phone 510 acts as a control point, and a desk-top computer 520 and a television (TV) 540 are UPnP devices. The mobile phone 510 includes an imaging unit that captures image data of an object and an output unit that outputs the image data. Each of the desk-top computer 520 and the TV 540 includes an output unit that outputs a mark.

Specifically, referring to FIG. 5(*a*), a mark 521 representing the desk-top computer 520 is displayed on a monitor of the desk-top computer 520, and a user may control the imaging unit of the mobile phone 510 to face the desk-top computer 520 so as to capture image data of the desk-top computer 520.

The mobile phone 510 may determine that the image data captured by the imaging unit corresponds to the desk-top computer 520 by recognizing the mark 521. The mobile phone 510 outputs the image data of the desk-top computer 520 together with information 514 regarding the desk-top computer 520, to a screen thereof.

Referring to FIG. 5(b), when the desk-top computer 520 is selected to be a server, the mobile phone 510 outputs a list of services 530 that the desk-top computer 520 provides, based on detailed information regarding the desk-top computer 520. It is assumed that the user selects an 'A.mpg' file from the list of services 530.

Referring to FIG. 5(c), the user controls the imaging unit of the mobile phone 510 to face the TV 540 so as to obtain image data of the TV 540.

The mobile phone 510 may determine that the image data captured by the imaging unit corresponds to the TV 540 by recognizing a mark 541. The mobile phone 510 outputs the image data of the TV 540 together with information 544 regarding the TV 540, to the screen thereof.

Referring to FIG. 5(d), when the TV 540 is selected to be a client, the mobile phone 510 controls the TV 540 and the desk-top computer 520 to reproduce the 'A.mpg' file in the TV 540.

Figure 6:
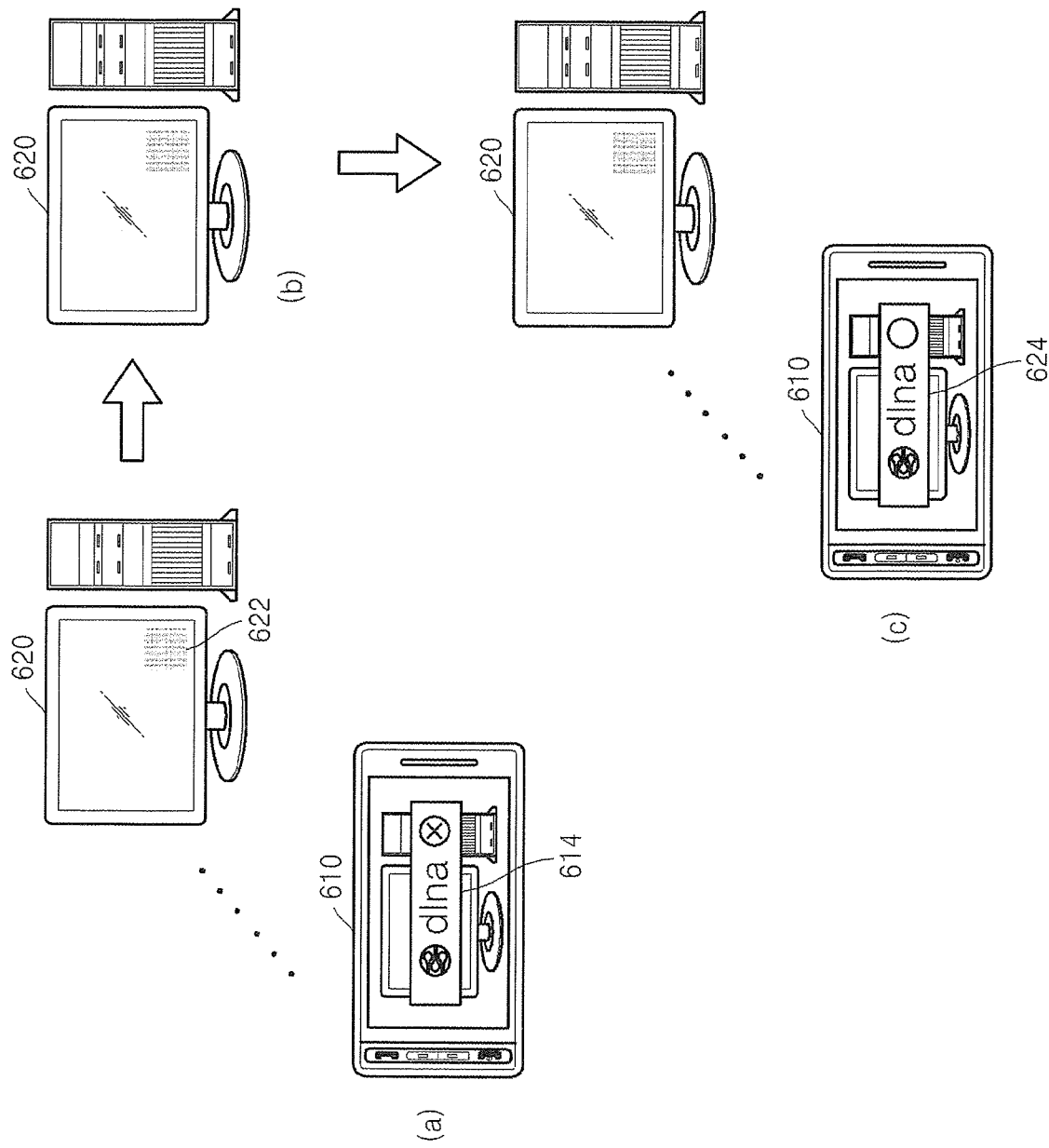
FIG. 6 is a diagram illustrating a method of providing content to a user by using a communication establishing system, according to another embodiment of the present invention.

FIG. 6 is a diagram illustrating a method of providing content to a user by using a communication establishing system, according to another embodiment of the present invention. In FIG. 6, a mobile phone 610 acts as a control point and a desk-top computer 620 is a UPnP device.

Referring to FIG. 6(a), a user controls an imaging unit of the mobile phone 610 to face the desk-top computer 620 so as to capture image data of the desk-top computer 620.

Referring to FIG. 6(a), the mobile phone 610 may determine that the image data captured by the imaging unit corresponds to the desk-top computer 620 by checking a mark 622. The mobile phone 610 outputs the image data of the desk-top computer 620 together with information 614 regarding the desk-top computer 620, to a screen thereof. The information 614 also represents a state of the desk-top computer 620. The information 614 includes information, indicated with 'X', signifying that data stored in the desk-top computer 620 is not available.

Referring to FIG. 6(b), the user changes the state of the desk-top computer 620. For example, the user changes a setting so that the data stored in the desk-top computer 620 may be provided from another device.

Referring to FIG. 6(c), the mobile phone 610 outputs the image data of the desk-top computer 620 together with information 624 regarding the desk-top computer 620, to the screen thereof. The information 624 represents the state of the desk-top computer 620. The information 624 includes information, indicated with "O", signifying that the data stored in the desk-top computer 620 is available.

Figure 7:
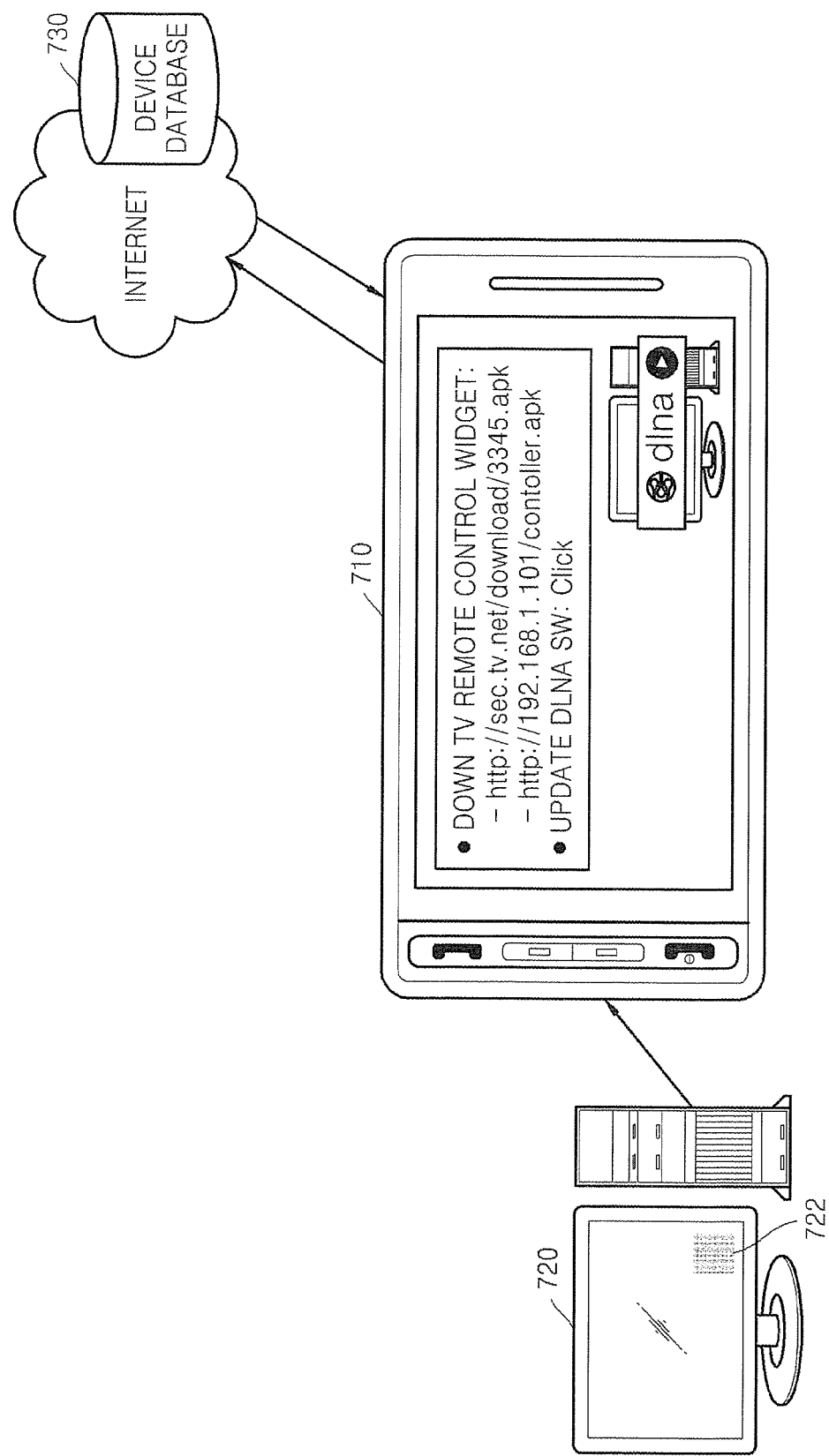
FIG. 7 is a diagram illustrating a method of providing content to a user by using a communication establishing system, according to yet another embodiment of the present invention.

FIG. 7 is a diagram illustrating a method of providing content to a user by using a communication establishing system, according to another embodiment of the present invention. In FIG. 7, a mobile phone 710 acts as a control point and a desk-top computer 720 is a UPnP device.

A user controls an imaging unit of the mobile phone 710 to face the desk-top computer 720 so as to capture image data of the desk-top computer 720. The mobile phone 710 may determine that the image data captured by the imaging unit corresponds to the desk-top computer 720 by recognizing a mark 722. The mobile phone 710 outputs the image data of the desk-top computer 720 together with information regarding the desk-top computer 720.

Also, the mobile phone 710 checks whether there is data or an application used to update the desk-top computer 720, based on the information regarding the desk-top computer 720. The mobile phone 710 receives the data or the application for updating the desk-top computer 720 from a database 730 via the Internet and then transmits the data or the application to the desk-top computer 720. In another embodiment of the present invention, the data and the application may be directly transmitted from the database 730 to the desk-top computer 720 without having to use the mobile phone 710.

FIG. 8 illustrates brief information regarding a first device 100 according to an embodiment of the present invention. The brief information includes address, state, and identification information regarding the first device 100. Referring to FIG. 8, a UUID 810 is used as the identification information regarding the first device 100.

FIG. 9 illustrates detailed information regarding a first device 100, according to an embodiment of the present invention. The detailed information includes information regarding the first device 100, e.g., a UUID, a friendly name, a manufacturer, a model name, and a model number, and a list of services that the first device 100 provides.

The detailed information may include a 'deviceMarkerURL' field 910. The 'deviceMarkerURL' field 910 is information representing an address at which a mark related to the first device 100 may be obtained. If the first device 100 does not include an output unit and thus cannot output the mark or if the second device 200 does not include a camera and thus cannot recognize the mark, then the first device 100 may designate a path in which the mark may be obtained, instead of outputting the mark. A control point may obtain the mark by using the 'deviceMarkerURL' field 910, and may display the mark on a screen thereof or output the mark by using a printer thereof.

In another embodiment of the present invention, when the second device 200 cannot recognize the mark, the first device 100 may output the friendly name or URL information regarding the first device 100 instead of outputting the mark, as described above. A user may compare the friendly name or the URL information obtained by the second device 200 with the friendly name or the URL information output by the first device 100 so as to identify the first device 100.

Figure 10:
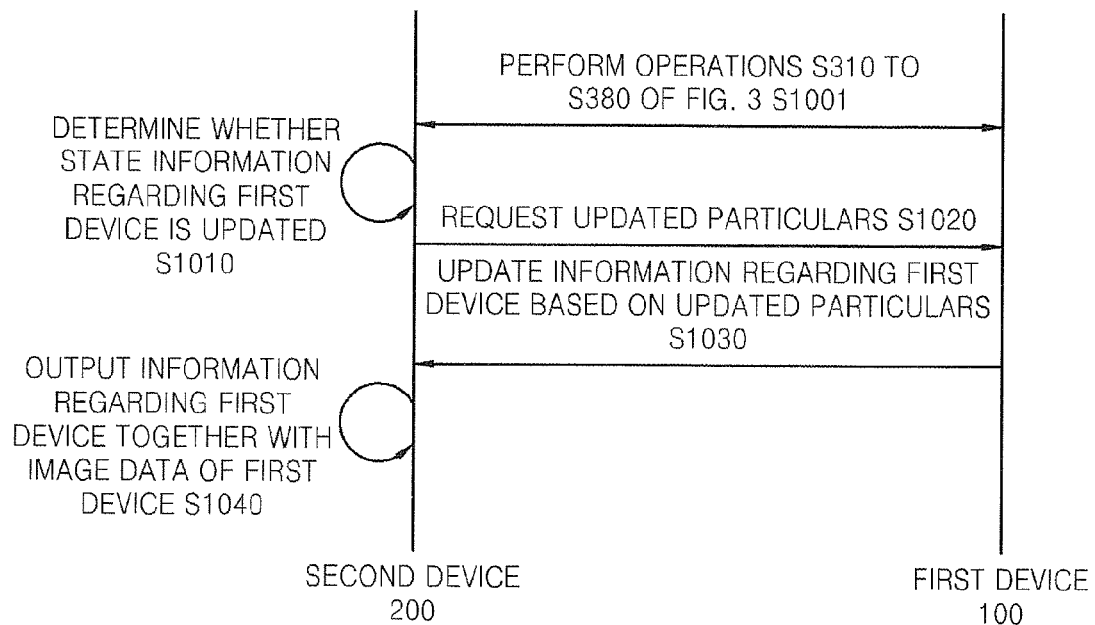
FIG. 10 is a flowchart illustrating a method of establishing communication between a second device and a first device, according to another embodiment of the present invention.

FIG. 10 is a flowchart illustrating a method of establishing communication between a second device 200 and a first device 100, according to another embodiment of the present invention. FIG. 10 illustrates an embodiment where a state of the first device 100 changes.

In operation S1001, the first device 100 and the second device 200 perform operations S310 to S380 of FIG. 3.

In operation S1010, the second device 200 analyzes a mark of the first device 100 to determine whether state information regarding the first device 100 is updated. The mark of the first device 100 may include a flag indicating whether state information regarding the first device 100 is updated, and the second device 200 may use the flag to determine whether state information regarding the first device 100 is updated. It is assumed that the first device 100 is a washing machine. The mark of the first device 100 may specify an operating state of the first device 100, e.g., draining, rinsing, or drying. The second device 200 may determine whether the operating state of the first device 100 changes by checking the mark.

In operation S1020, if the state information regarding the first device 100 is updated, the second device 200 requests the first device 100 to provide updated particulars.

In operation S1030, the second device 200 receives the updated particulars from the first device 100 and updates information regarding the first device 100 based on the updated particulars.

In operation S1040, the second device 200 outputs the information regarding the first device 100 including the updated particulars, together with image data of the first device 100.

Referring to FIG. 10, in another embodiment of the present invention, the mark of the first device 100 may also include the updated particulars.

If the mark of the first device 100 obtained by the second device 200 includes the updated particulars, the operation S1020 and the operation S1030 may be skipped. In this situation, the second device 200, after the operation S1010, directly operates the operation S1040 as described above to output the information regarding the first device 100 including the updated particulars, together with image data of the first device 100.

Figure 11:
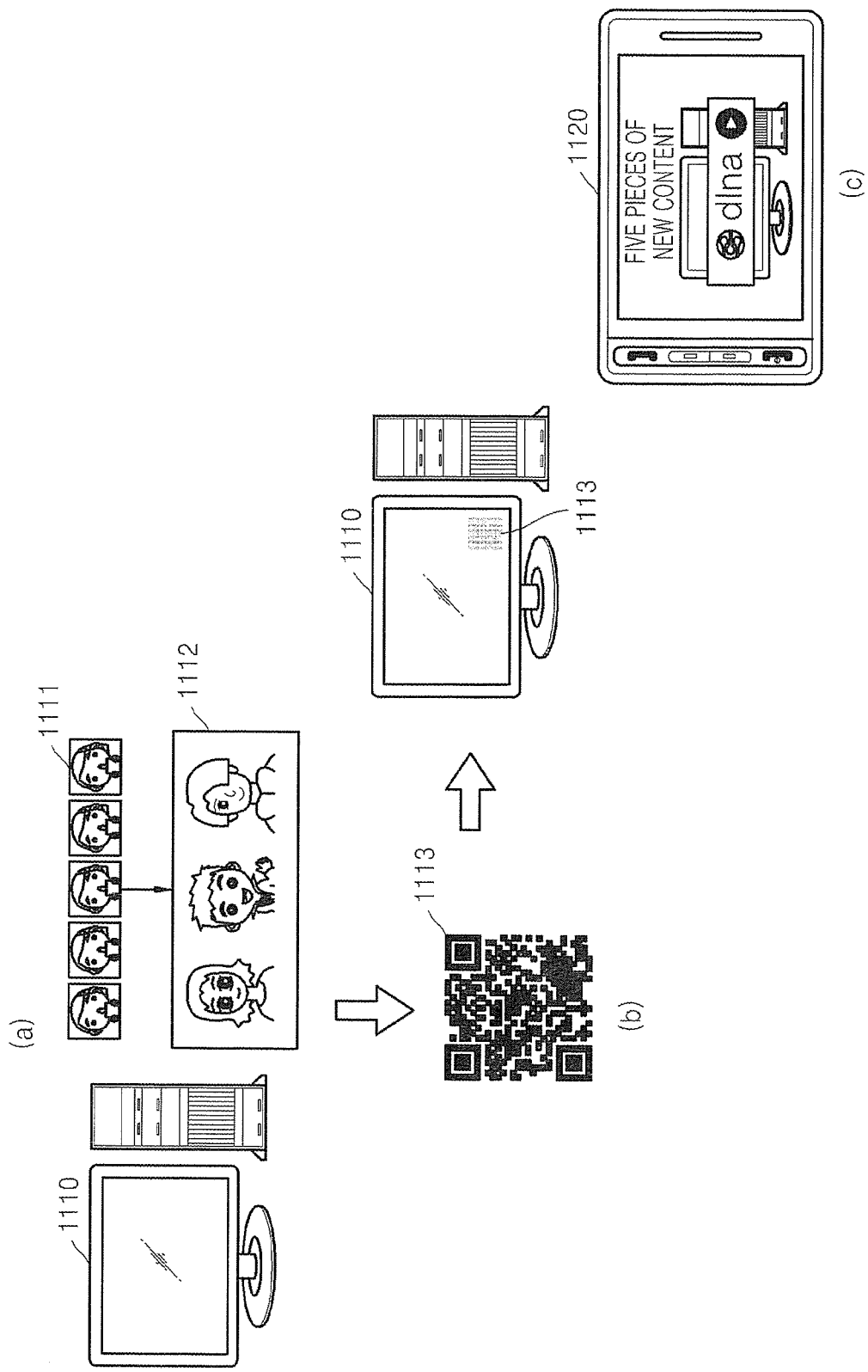
FIG. 11 is a diagram illustrating a method of providing content to a user by using a communication establishing system, according to another embodiment of the present invention.

FIG. 11 is a diagram illustrating a method of providing content to a user by using a communication establishing system, according to another embodiment of the present invention. In FIG. 11, a mobile phone 1120 acts as a control point and a desk-top computer 1110 is a UPnP device.

Specifically, FIG. 11(a) illustrates an embodiment where content stored in the desk-top computer 1110 is updated. It is assumed that three pieces of content 1112 were initially stored in the desk-top computer 1110 and five pieces of new content 1111 are additionally stored.

Referring to FIG. 11(b), the desk-top computer 1110 generates and outputs a mark 1113 that includes information indicating such a change in a state of the desk-top computer 1110. In another embodiment of the present invention, information indicating that the five pieces of new content 1111 are further stored in the desk-top computer 1110, may be included in the mark 1113.

Referring to FIG. 11(c), the mobile phone 1120 recognizes the mark 1113 and determines that the state of the desk-top computer 1110 has changed. The mobile phone 1120 receives information regarding the state of the desk-top computer 1110 from the desk-top computer 1110 and grasps the change in the state of the desk-top computer 1110 based on this information. The mobile phone 1120 may output the information indicating that the five pieces of new content 1111 are further stored in the desk-top computer 1110, together with image data of the desk-top computer 1110.

If a user selects content from among the three pieces of content 1112 and the five pieces of new content 1111, the mobile phone 1120 requests the desk-top computer 1110 to provide the selected content.

Figure 12:
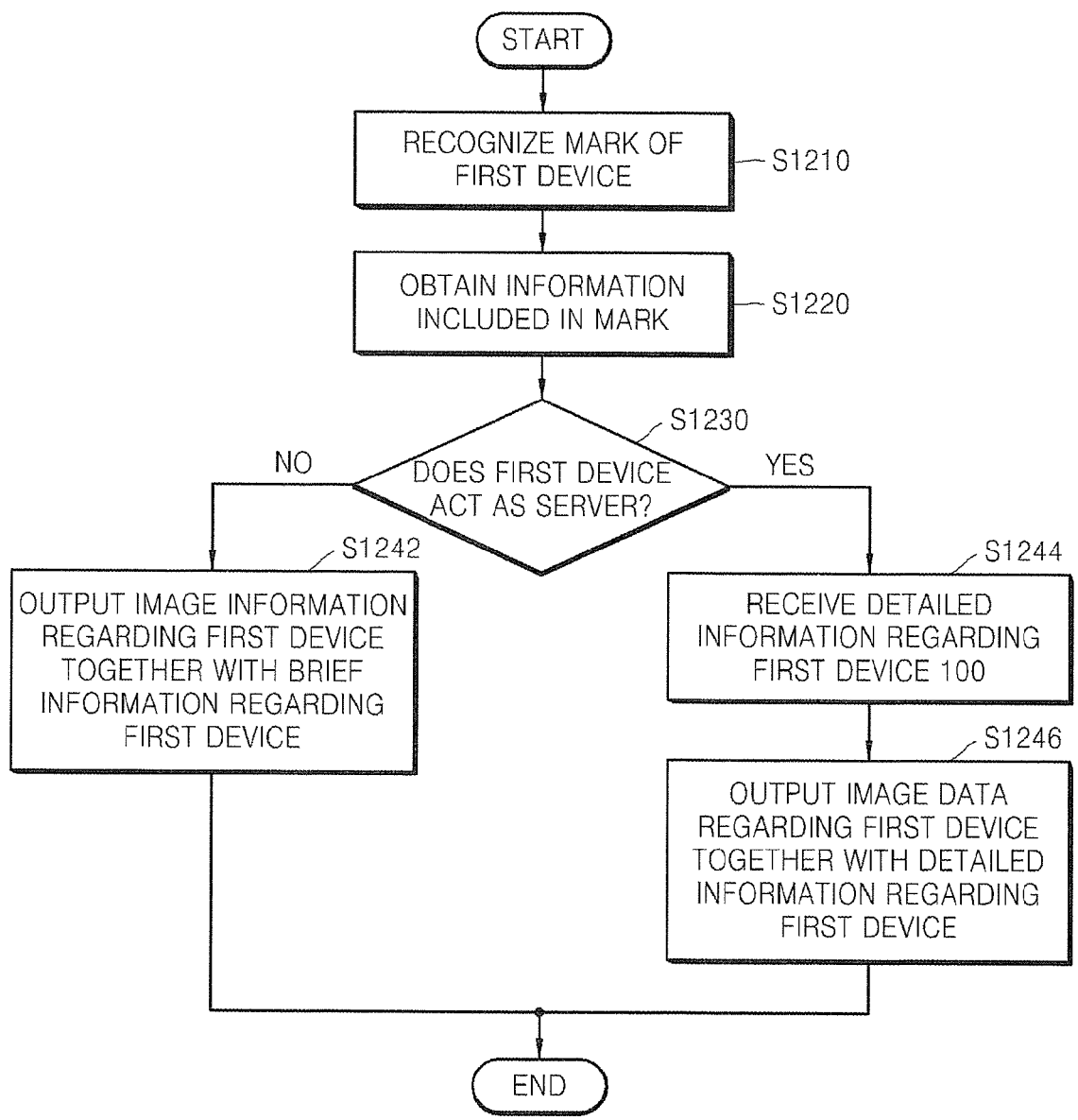
FIG. 12 is a flowchart illustrating a method of providing a service from a second device, according to an embodiment of the present invention.

FIG. 12 is a flowchart illustrating a method of providing a service from a second device 200, according to an embodiment of the present invention.

In operation S1210, an imaging device of the second device 200 recognizes a mark of a first device 100.

In operation S1220, the second device 200 obtains information included in the mark. The mark may include information, e.g., identification information, regarding the first device 100 as described above.

In operation S1230, the second device 200 determines whether the first device 100 acts as a server. Whether the first device 100 acts as a server may be determined based on the information regarding the first device 100 or based on a user's input. If the first device 100 does not act as a server, operation S1242 is performed. If the first device 100 acts as a server, operation S1244 is performed.

In operation S1242, the second device 200 outputs image information regarding the first device 100 together with brief information regarding the first device 100.

In operation S1244, the second device 200 receives detailed information regarding the first device 100 from the first device 100.

In operation S1246, the second device 100 outputs the image data regarding the first device 100 together with the detailed information regarding the first device 100.

Figure 13:
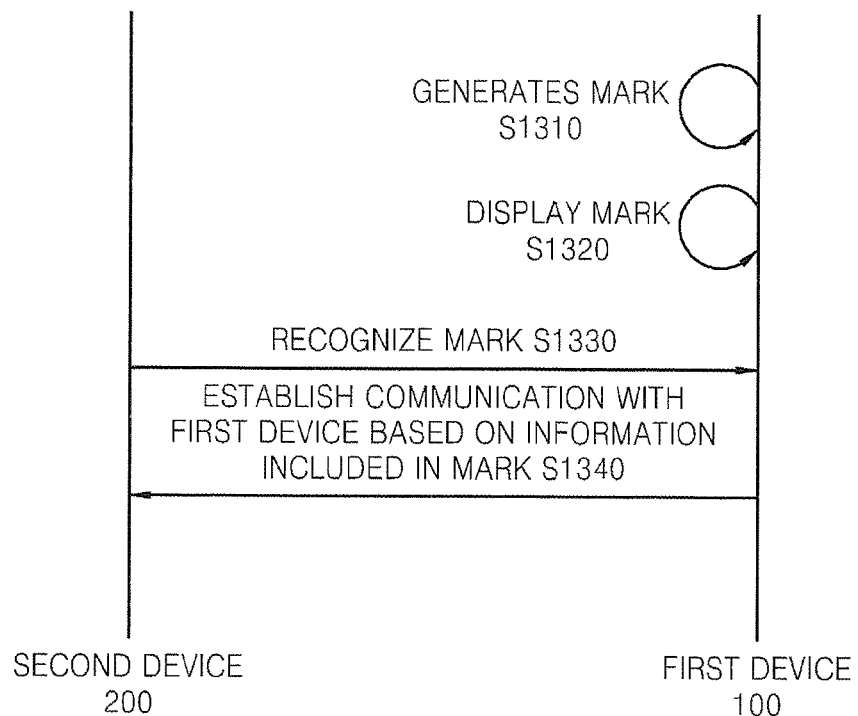
FIG. 13 is a flowchart illustrating a method of establishing communication between a first device and a second device, according to another embodiment of the present invention.

FIG. 13 is a flowchart illustrating a method of establishing communication between a first device 100 and a second device 200, according to another embodiment of the present invention. In operation S1310, the first device 100 generates a mark representing the first device 100 itself.

In operation S1320, the first device 100 outputs the mark to an output unit thereof or displays the mark on a surface thereof.

In operation S1330, the second device 200 recognizes the mark.

In operation S1340, the second device 200 establishes communication with the first device 100 based on information included in the mark.

Figure 14:
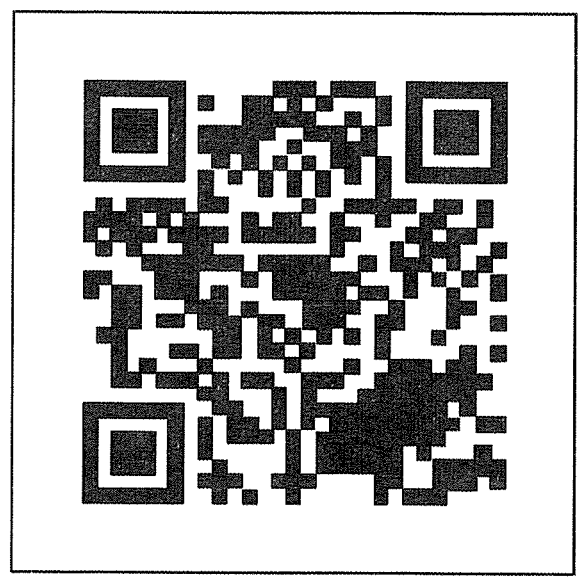
FIG. 14 illustrates a mark according to an embodiment of the present invention.

FIG. 14 illustrates a mark according to an embodiment of the present invention. In FIG. 14, the mark includes information regarding a first device 100, such as identification information regarding the first device 100. The mark may be any type of code, e.g., a QR code, containing the information regarding the first device 100.

The above embodiments of the present invention may be embodied as a computer program. The computer program may be stored in a computer readable recording medium, and executed using a general digital computer. Examples of the computer readable medium are a magnetic recording medium (a ROM, a floppy disc, a hard disc, and the like), and an optical recording medium (a CD-ROM, a DVD, and the like).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of establishing communication, the method comprising:
   obtaining, by an imaging unit of a second device, image data displayed on a display unit of a first device;
   analyzing, by the second device, the image data to recognize a mark representing the first device so as to establish communication with the first device; and
   establishing, by the second device, communication with the first device based on information included in the mark by:
      requesting the first device to provide detailed information including information regarding services provided by the first device based on the information included in the mark,
      obtaining the detailed information from the first device, and
      providing the first device with a control signal for controlling the first device to receive data associated with a service provided by a third device.

2. The method of claim 1, further comprising outputting, at a display unit of the second device, the image data of the first device together with information regarding the first device.

3. The method of claim 2, wherein establishing of communication with the first device further comprises receiving at least one service from the first device based on a user's input corresponding to the output image data and the information.

4. The method of claim 2, wherein establishing of communication with the first device further comprises providing the first device with at least one service received from a third device based on a user's input corresponding to the output image data and the information.

5. The method of claim 1, further comprising receiving, by the second device, brief information regarding the first device from the first device, the brief information including identification information regarding the first device, wherein establishing of communication with the first device comprises:
  searching, by the second device, for the brief information regarding the first device by comparing the information included in the mark with brief information regarding at least one device included in a network to which the second device belongs; and
  establishing communication, by the second device, with the first device based on the searched-for brief information.

6. The method of claim 1, wherein the mark is a quick response (QR) code output to a display unit included in the first device.

7. The method of claim 1, wherein the information included in the mark comprises:
  identification information regarding the first device; and
  additional information regarding the first device.

8. The method of claim 7, wherein the additional information comprises at least one of:
  a flag indicating whether a state of the first device changes; and
  information regarding a change in the state of the first device.

9. The method of claim 1, wherein the detailed information comprises at least one of:
  a list of services that the first device provides;
  state information regarding the first device; and
  manufacturing information regarding the first device.

10. The method of claim 1, wherein the first device is a universal plug and play (UPnP) device, and the second device is a control point that controls the UPNP device.

11. A method of establishing communication, the method comprising:
  generating, by a first device, a mark representing the first device to be recognized by a second device;
  displaying, by the first device, the mark on a display unit of the first device; and
  establishing, by the first device, communication with the second device when the second device recognizes the mark by:
    receiving a request from the second device to provide detailed information including information regarding services provided by the first device based on the information included in the mark;
    transmitting the detailed information to the second device; and
    receiving, from the second device, a control signal for controlling the first device to receive data associated with a service provided by a third device.

12. The method of claim 11, wherein the mark comprises:
  identification information regarding the first device; and
  additional information regarding the first device.

13. The method of claim 12, wherein the mark further comprises at least one of:
  a flag indicating whether a state of the first device changes; and
  information regarding a change in the state of the first device.

14. An apparatus for establishing communication with an external device, the apparatus comprising:
  an imaging unit configured to obtain image data displayed on a display unit of the external device;
  a mark recognition unit configured to analyze the image data to recognize a mark indicating the external device so as to establish communication with the external device;
  a communication establishing unit configured to establish communication with the external device based on information included in the mark;
  a transmission unit configured to transmit a signal requesting detailed information regarding the external device based on the information included in the mark, the detailed information including information regarding services provided by the external device; and
  a receiving unit configured to receive the detailed information from the external device,
  wherein the transmission unit is further configured to provide the external device with a control signal for controlling the external device to receive data associated with a service provided by a third device.

15. The apparatus of claim 14, wherein the apparatus further comprises an output unit configured to output the image data together with information regarding the external device.

16. The apparatus of claim 15, wherein the communication establishing unit is further configured to receive at least one service from the external device based on a user's input corresponding to the output image data and information.

17. The apparatus of claim 15, wherein the communication establishing unit is further configured to provide at least one service to the external device based on a user's input corresponding to the output image data and information.

18. The apparatus of claim 14, further comprising a receiving unit configured to receive brief information regarding the external device from the external device,
  wherein the communication establishing unit is configured to search for the brief information regarding the external device by comparing information included in the mark with brief information regarding at least one device included in a network to which the apparatus belongs, and to establish communication with the external device based on the searched-for brief information regarding the external device.

19. The apparatus of claim 14, wherein the mark is a quick response (QR) code output to a display unit included in the external device.

20. The apparatus of claim 14, wherein the information included in the mark comprises:
  identification information regarding the external device; and
  additional information regarding the external device.

21. The apparatus of claim 20, wherein the additional information comprises at least one of:
  a flag indicating whether a state of the external device changes; and
  information regarding a change in the state of the external device.

22. The apparatus of claim 14, wherein the detailed information comprises at least one of: a list of services that the external device provides; state information regarding the external device; and manufacturing information regarding the external device.

23. The apparatus of claim 14, wherein the external device is a universal plug and play (UPnP) device, and the apparatus is a control point that controls the UPNP device.

24. An apparatus for establishing communication with an external device, the apparatus comprising:
  a mark generation unit configured to generate a mark indicating the apparatus to be recognized by the external device;
  a mark display unit configured to display the mark;
  a communication establishing unit configured to establish communication with the external device when the external device recognizes the mark;

a receiving unit configured to receive a request from the external device to provide detailed information including information regarding services provided by the apparatus based on the information included in the mark; and a transmission unit configured to transmit the detailed information to the external device, wherein the receiving unit is further configured to receive, from the external device, a control signal for controlling the apparatus to receive data associated with a service provided by a third device.

25. The apparatus of claim 24, wherein the mark comprises:
   identification information regarding the apparatus; and
   additional information regarding the apparatus.

26. The apparatus of claim 25, wherein the mark comprises at least one of:
   a flag indicating whether a state of the apparatus changes; and
   information regarding a change in the state of the apparatus.

27. The apparatus of claim 24, further comprising a receiving unit configured to display data, wherein the mark display unit comprises an output unit for outputting the mark to the display unit.

28. A non-transitory computer readable recording medium encoded with computer-executable instructions that, when executed, cause a data processing system to:
   obtain, by an imaging unit of a second device, image data displayed on a display unit of a first device;
   analyze, by the second device, the image data to recognize a mark representing the first device so as to establish communication with the first device; and
   establish, by the second device, communication with the first device based on information included in the mark by:
      requesting the first device to provide detailed information including information regarding services provided by the first device based on the information included in the mark;
      obtaining the detailed information from the first device, and
      providing the first device with a control signal for controlling the first device to receive data associated with a service provided by a third device.

* * * * *